Reissued Feb. 22, 1949

Re. 23,085

UNITED STATES PATENT OFFICE 23,085

PREVENTION OF FOAMING IN STEAM GENERATION

Lewis O. Gunderson, Park Ridge, Ill., assignor to Dearborn Chemical Company, Chicago, Ill., a corporation of Illinois No Drawing. Original No. 2,328,551, dated September 7, 1943, Serial No. 330,993, April 22, 1940. Application for reissue August 18, 1944, Serial No. 550,072

9 Claims. (Cl. 252—321)

This invention relates to a method of conditioning water for the prevention of foaming in steam boilers. More particularly, the invention pertains to a method of the nature indicated involving the addition of predominantly hydrophobic organic compounds whose molecules comprise a central group of closely spaced radicals together with a plurality of long radial unsubstituted hydrocarbon chains.

Foaming of boiler water is not, as commonly thought, equivalent to an accumulation of foam on top of the surface of the boiler water. When steam is rapidly withdrawn from a boiler with resultant foaming there is no water surface within the boiler correlated with the water level indicated in the conventional water glass attached to the boiler. In other words, these is no sharp line of demarcation between solid water and foam in the boiler during rapid steam withdrawl.

The foaming of boiler water is actually a rapid expansion of the water in the steam generating area of the boiler brought about by the fact that rapidly forming small steam bubbles do not coalesce until a definite short time after their formation. As a consequence, the entire volume of water in the generating area is expanded by myriads of bubbles until the thus formed so-called "light water" may fill the steam space and become entrained with the steam leaving the boiler.

In other words, bubbles need not be particularly stable to cause boiler foaming. The stability of the bubbles need be only such that the bubbles last but a very few seconds after passing the plane of the water level indicated in the water glass.

I have found that even the slight degree of stabilization of bubbles which suffices to cause foaming of boiler water may be largely or completely inhibited by the addition thereto of relatively stable, predominantly hydrophobic organic compounds whose molecules comprise a central group of closely spaced hydrophilic radicals together with a plurality of long hydrophobic unsubstituted hydrocarbon chains disposed radially in reference to the radicals. The hydrocarbon chains may be straight or branching. In any case, the radial chains should provide at least 12 and preferably 16 carbon atoms disposed on each of a plurality of sides of the group of closely spaced polar radicals. Among the polar radicals contemplated may be mentioned quarternary groups such as quaternary ammonium groups, the ester, ether, carboxyl, hydroxyl, carbonyl, sulfate, sulfonate, sulfamate, amine, amide, carbonate, thiocarbonate carbamate, thiocarbamate, phosphate, mercaptan, and other groups. The polar radicals employed should preferably not be subject to saponification under boiler conditions and should further be hydrophilic enough to inhibit volatilization with steam.

It is therefore an important object of the present invention to provide a method of conditioning water for boiling comprising the addition thereto of predominantly hydrophobic surface-active complex organic compounds whose molecules comprise a central group of polar radicals together with a plurality of hydrocarbon chains grouped radially in reference to the polar radicals.

Another important object of this invention is to provide a method of conditioning boiler water comprising the addition of an organic compound of the type disclosed in the preceding paragraph in which the polar radical or group of radicals is selected from a class comprising the quaternary radicals, in particular, the quaternary ammonium radicals, the sulfate, sulfonate, sulfamate, carboxyl, carbonyl, hydroxyl, ether, amino, amide, carbonate, thiocarbonate phosphate, carbamate, thiocarbamate, mercaptan, ester and the like groups, preferably those which are not subject to saponification under boiler conditions and which are hydrophilic enough to inhibit, largely or completely, volatilization with steam.

Other and further objects of the present invention will become apparent to those skilled in the art from the following description and thereto appended claims.

The methods according to the present invention will be more clearly understood in the light of the following hypotheses. However, the merits of this invention do not hinge on the correctness of these hypotheses.

Stable aqueous foams are thought to be stabilized by organic substances of a high molecular weight whose molecules include terminal polar or hydrophilic radicals. Soaps are an example. Such substances are considered to be only polarly soluble and hence preferentially adsorbed in the gas-liquid interface with a large hydrocarbon portion (hydrocarbon tail) extending into the gaseous phase. The dipole effects of such polar substances preferentially adsorbed in the gas-liquid interface around individual bubbles conceivably bring about orientation of adjacent polar water molecules forming enveloping films. Such films not only mechanically prevent close approach and coalescence of adjacent bubbles but also set up electrostatic forces mutually repelling such bubbles, for the charges on the outside of these films are of the same sign, being constituted by the similar poles of the oriented water molecules.

In other words, polar and hence surface-active substances of the nature indicated effect the formation of predominantly hydrophilic films around the bubbles which set up repulsive forces acting between individual bubbles to prevent their coalescense.

Modern locomotive boilers provided with feed water heaters, exhaust steam injectors and other auxiliary devices have provisions for returning the steam condensate from these devices to the boiler feed water which is injected into the boiler. By these means oil colloidally dispersed in the condensate enters the boiler. Much of this colloidal oil is valve oil which conventionally comprises a mineral oil compounded with some vegetable oil or saponifiable organic substance designed to decrease the interfacial tension between the oil and the metallic surface of the valves. The latter substances are polar compounds which tend to promote foaming.

Most organic matter naturally present in boiler feed water is too soluble or too slightly surface-active to form a surface film capable of stabilizing foam.

Most of the finely divided inorganic solid matter dispersed in boiler water, particularly colloidally dispersed matter is completely wetted by the water and therefore displays practically no surface-active properties. Alkaline earth carbonates and hydroxides are examples of such solids encountered in boiler feed water or boiler water. The most strongly hydrophilic colloidally suspended matter, for instance, colloidal siliceous matter, is not only completely wetted but also enveloped by films of strongly adsorbed water.

It is believed that a bubble stabilizing effect sufficient to effect boiler foaming is obtained when under certain conditions dissolved hydrophilic organic matter having terminal polar radicals such as OH, $NH_2$, COONa, and the like, is adsorbed on colloidal or microscopic particles dispersed in the feed water or boiler water, such as suspended soil particles, precipitated alkaline earth carbonates or hydroxides and other dispersed particles. In such adsorption the terminal polar portions of the molecules are thought to be attached to the solid particle, which is thereby rendered less hydrophilic by the outwardly projecting hydrocarbon tails of the adsorbed organic molecules, the polar radicals being more or less shielded from the water. The adsorbing wetted particle and the adsorbed hydrophilic organic matter are thereby rendered sufficiently hydrophobic to be surface-active while still remaining sufficiently hydrophilic to be able to set up, in steam-water interfaces, films of oriented water molecules.

The term "colloidal" used in this specification refers to the state of matter dispersed in water as particles having sizes ranging between microscopic and poly molecular. Most of these particles are visible in the ultra-microscope, but when particles approach the poly molecular size represented by primary crystal formation they are actually not visible in the ultra-microscope, although intense illumination may make a slight Tyndall cone discernible. It is thought that these almost primary crystal particles in the outer fringe of the conventional range of colloidal particles are of considerable importance by adsorbing certain organic polar molecules under specific conditions of pH value, electrolyte concentration, temperature and other factors. Such adsorptive affinity between certain particles and certain polar organic molecules may be highly specific.

Some particles may adsorb a sufficient amount of organic matter to be made completely hydrophobic. They are also preferentially adsorbed in the steam-water interfaces where the particles act to stabilize foam mechanically.

Whether any adsorption at all will take place, and, if so, to what extent, depends on the nature of the organic matter present as well as on the nature of the dispersed particles. Some organic substances are adsorbed highly selectively by specific particles; others are readily adsorbed by most particles.

The amount of adsorption taking place also depends on the pH value and electrolyte concentration in the boiler water as well as on the presence or absence of certain substances hereinafter designated as "depressants" which are capable of inhibiting adsorption. Such depressants include soluble compounds of the heavy metals, carboxylic acids such as citric acid, and dispersed gels produced by the interaction of heavy metal salts with silica or alkali silicates. Such inorganic hydrophilic colloids may be sufficiently stabilized by hydroxyl ions in the feed water or by the addition of organic protective colloids such as dextrine, gelatine, gums, tannin, and the like.

Conditions favoring adsorption do not usually obtain in fresh boiler feed water. Operation prolonged for a shorter or longer time as a rule modifies pH value, electrolyte concentration, and like conditions until after a time depending upon the composition of the feed water involved, rapid withdrawal of steam begins to cause foaming and entrainment of water with steam.

For instance, in some localities the available feed water supplies are of such nature that when a concentration of 150 grains to 200 grains per gallon of total dissolved solids is attained in the boiler water foaming occurs at a definite rate of steam takeoff. The initial concentration effective to produce foaming depends in part on the pH of the boiler water, in part on the nature and amount of the suspended particle, in part on the nature and amount of organic matter in the water, and a great deal upon the nature and amount of the inorganic substances dissolved in the water.

In other localities, concentrations of dissolved solids in boiler water many times the above disclosed figures are attainable before foaming occurs. Or, no foaming whatever may occur except at intervals when certain of the factors mentioned are causing temporary or more or less permanent adsorption of hydrophilic organic substances and concentration of adsorbing solid particles in the steam-water interface.

I have visually observed such intermittent expansion of boiler water at 250 pounds boiler pressure inside the boiler of a large modern locomotive having several high pressure sight glasses located in the steam dome of the locomotive with two 1000 watt lamps located inside the boiler to provide ample illumination. By these means I have observed how suspended matter, including calcium and magnesium carbonates and hydroxides and other particles, is concentrated in the surface of the bubbles during periods of operation of the boiler when foaming occurs, corresponding with fairly definite concentrations of alkali salts in the boiler water. At intermittent periods when foaming does not occur the positive adsorption of this suspended matter in the steam bubble surfaces appears to cease, indicating the absence of certain optimum conditions of electrolyte concentration, pH value and concentration of suspended matter which appear to be necessary to produce the "flotation" effect thought to induce foaming.

Foaming is particularly apt to occur when certain feed waters enter the boiler and are mixed with the boiler water. The organic matter in one water is then adsorbed by the suspended particles and colloidal matter in the other water, or vice versa. In either case, surface-activity of both substances is increased bringing about conditions favorable for foam formation.

Two or more types of organic matter of different characteristics may conceivably interact to mutually reduce their solubilities, thus increasing adsorption in the steam-water interface and favoring foam formation.

My co-pending application United States Serial No. 261,683, filed March 13, 1939, now abandoned, entitled "Method of conditioning water," discloses methods of conditioning water for boiling comprising the addition thereto of predominantly hydrophobic surface-active organic compounds whose molecules comprise widely spaced hydrophilic radicals which are thought to cause horizontal orientation of the molecules in the steam-water interface with formation of an expanded type of surface film, preferably, a gaseous type of film.

Other methods disclosed in my co-pending United States application Serial No. 261,683 provide means for inhibiting foam formation in steam boilers including the incorporation of siliceous micelles with the boiler water.

My co-pending United States application Serial No. 305,959, filed November 24, 1939, now Patent No. 2,442,768, issued June 8, 1948, entitled "Method of conditioning water," deals particularly with the inhibition of foaming by the addition to the boiler water of specified classes of predominantly hydrophobic surface-active organic substances comprising widely spaced polar radicals thought to induce horizontal orientation of the molecules with formation of surface films of the gaseous type.

In distinction from the methods of my co-pending applications the methods according to the present invention involve the addition to boiler water of predominantly hydrophobic surface-active organic compounds whose molecules comprise a plurality of long unsubstituted hydrocarbon chains spaced by a group of closely spaced hydrophilic radicals from which the hydrocarbon chains radiate. If only two hydrocarbon chains are provided in the molecule, the same may be arranged in straight line with each other and the group of radicals in which case the hydrocarbon chains may be described as terminal with reference to the group of radicals.

The compounds of the present invention are thought to form surface films of the gaseous type. The reasons for this belief and the manner in which such films of the gaseous type are thought to inhibit foam formation are explained hereinbelow.

The compounds of the present invention are surface-active, for while they are predominantly hydrophobic, comprising long hydrocarbon chains, the compounds also include strongly hydrophilic groups. Horizontal orientation of the molecules of the compounds in question may occur if the magnitude, nature and disposition of the plurality of hydrocarbon chains are so balanced that the effort of each chain to enter the gas space is frustrated by similar attempts of the other chain or chains. The kinetic energy of the group of hydrophilic radicals is thought to induce violent oscillations of the long hydrocarbon chains, with consequent lateral displacement of the surface-active organic molecules to produce the maximum of lateral displacement effecting the formation of a surface film of the gaseous type. The polar groups of different molecules are shielded from each other by the terminal or radial hydrocarbon chains, so that the tendency of the polar groups to associate is unable to assert itself.

The pronounced surface-activity of the compounds of the present invention assures that the molecules thereof will penetrate into the stream-water interface. The tendency of the molecules to expand, to be displaced laterally, rather than to associate disperses the molecules throughout the boiler water, so that some foam inhibitor will be present in the interface of each incipient steam bubble. The hydrophobic nature of the thin gaseous films formed in such interfaces by the molecules of the compounds of this invention precludes formation of a layer of polarly oriented water molecules. The efficiency of this foam inhibiting surface film is not necessarily dependent upon exclusive occupation of the steam-water interface by the foam inhibiting compound. The interface may conceivably be shared with strongly surface-active terminally polar substances that may be more or less vertically oriented in this interface. But the net result is the formation of at least patches of a predominantly hydrophobic type of interfacial film wherein the hydration effect is reduced to a minimum and the electrical charges of the surface film are likewise reduced to a minimum, thus removing the two repelling influences preventing coalescence of steam bubbles. This hypothesis also explains why even extremely minute quantities of foam inhibiting substances are effective to inhibit foam formation. This effect is surprisingly great, being sufficient to overcome even the strong foaming tendency induced by water soluble wetting agents.

The most efficient of the compounds of the present invention are those that are most highly surface-active and at the same time have sufficient hydrophilic characteristics to prevent steam volatilization. The hydrophilic and hydrophobic portions of said molecules are also so proportioned as to not only provide these two important characteristics but also to permit the maximum freedom of movement of the hydrocarbon chains. These molecules are thus permitted to exert to the greatest possible extent their kinetic energy derived from the polar radicals in the steam-water interface whereby maximum lateral displacement and expansion of these and other surface-active molecules in the interface is accomplished. In other words, the most efficient foam inhibiting compound is one that produces a gaseous film of greatest expansion consistent with firm anchorage to the aqueous phase to prevent steam volatilization.

The polar radicals are therefore of the relatively non-saponifiable, non-hydrolyzable type, to enhance their chemical stability under boiler conditions wherein high temperatures and high alkalinities obtain. At the same time the polar radicals are sufficiently active so that their kinetic energy may produce the desired oscillations of the hydrocarbon chains in the steam-water interface. The fact that the compounds are saturated adds materially to their ability to resist decomposition.

The organic substances according to this invention will continue to inhibit foam formation only as long as they are not chemically modified, adsorbed or volatilized, and, specifically, so long as the hydrophilic radical or radicals are not adsorbed on the surface of colloidal or microscopic particles suspended or dispersed in the aqueous phase, whereby the hydrophilic anchorage is destroyed.

Examples of classes of compounds and of specific compounds according to this invention more effective than the conventional castor oil emulsion for the prevention of foaming of boiler water are listed hereinbelow.

EXAMPLES

*Esters*

(1) Tricetyl citrate $$\begin{array}{l} CH_2COOC_{16}H_{33} \\ | \\ C(OH)COOC_{16}H_{33} \\ | \\ CH_2COOC_{16}H_{33} \end{array}$$

(2) Distearyl ester of succinic acid $$C_{18}H_{37}OOC—CH_2—CH_2—COOC_{18}H_{37}$$

(3) Ethylene glycol distearate $$C_{18}H_{35}OO—CH_2—CH_2—OOC_{18}H_{35}$$

*Amides*

(4) Dipalmito-amide of ethylene diamine $$C_{15}H_{31}CO—NH—CH_2—CH_2—NH—CO—C_{15}H_{31}$$

(5) Butane dicetyl amide $$(C_{16}H_{33})NH—CO—CH_2—CH_2—CH_2—CH_2—CO—NH(C_{16}H_{33})$$

(6) Palmityl amide of ethyl palmitate $$C_{15}H_{31}COO—CH_2—CH_2—NH—OCC_{15}H_{31}$$

I have found that although ester groups attached to short hydrocarbon chains are readily saponifiable under boiler water conditions, ester groups attached to long hydrocarbon chains are very resistant to saponification, having a serviceable life several times greater than that of conventional castor oil emulsions. The hydrocarbon chains should not be long enough to unduly overbalance the polar groups whose kinetic energy causes the lateral expansion effecting the formation of gaseous films.

Foam inhibiting amides according to this invention may be prepared by introducing acyl radicals into amines such as diethanol amine, triethanol amine and ethanol ethylene diamine. Such acyl radicals should contain at least 12 carbon atoms preferably at least 16 carbon atoms. Such compounds containing acyl groups having 16 carbon atoms have the following structure:

1. $C_{15}H_{31}COO—CH_2—CH_2—N(COC_{15}H_{31})—CH_2—CH_2—COOC_{15}H_{31}$

2. $C_{15}H_{31}COO—CH_2—CH_2—N(CH_2—CH_2—OOCC_{15}H_{31})—CH_2—CH_2—COOC_{15}H_{31}$

3. $C_{15}H_{31}COO—CH_2—CH_2—N(COC_{15}H_{31})—CH_2—CH_2—NHCOC_{15}H_{31}$

Formula No. 1 shows an acylated derivative of diethanol amine. Formula No. 2 shows an acylated derivative of triethanol amine and formula No. 3 shows an acylated derivative of ethanol ethylene diamine.

The foam inhibiting substances of this invention, of which the above disclosed compounds and types of compounds are illustrative examples, either singly or in various combinations, may be added to boiler waters as alcoholic solutions (or dissolved in other organic solvents), or as aqueous emulsions or dispersions, in amounts from 0.2 part per million to as much as 25 parts per million. The addition of greater amounts is possible but not economical. These additions may be made both to the feed water and by injection into the boiler, the latter at intervals, as described in my United States Patent No. 1,911,756, dependent upon the rate of loss of foam inhibiting material from the boiler by adsorption, agglomeration, decomposition or volatilization, on the efficacy of the foam inhibiting substance, on the amount of water soluble wetting agents and/or other foam producing agents present, and like factors.

There exist considerable differences as to efficacy, stability, adsorption affinities and other characteristics as between the various types of foam inhibiting substances disclosed hereinabove and as between the individual members thereof. Those skilled in the art will at once recognize these differences and will know how to adapt any particular foam inhibiting substance to their particular purposes. The following remarks will serve as an additional guide to those skilled in the art, to lead them, in the light of their previous experience, to the proper application of the principles of this invention to their particular problems.

The central polar radicals may be directly associated or they may be spaced by one to five carbon atoms, depending upon hydrophilic potency of the radicals and the number and length of the hydrocarbon chains attached thereto. Greater spacing of the radicals is preferred because it permits a greater latitude in placing the long hydrocarbon chains and tends to inhibit more completely the tendency of the long hydrobarcon chains of the molecule to agglomerate.

In any case the number, nature and arrangement of the radical hydrocarbon chains and more or less central hydrophilic radicals are so balanced as to produce a predominantly hydrophobic character coupled with high surface-activity, minimum volatility with steam, and maximum of lateral displacement to produce a gaseous type of film characterized by great expansion.

The addition of foam inhibiting compounds according to the present invention may be accompanied by addition of the hereinabove mentioned depressants which are capable of inhibiting the adsorption of the foam inhibiting compounds on solid particles dispersed in the boiling water. Carboxylic acids or their salts such as citric, tartaric, succinic, and like acids are particularly effective depressants. From about 0.2 to 1 part per million or more of carboxylic acids may be added.

Soluble compounds of heavy metals, particularly manganese, thorium, tin, zirconium, molybdenum, lead, zinc, copper, iron, tungsten, cadmium, mercury, antimony, bismuth, and titanium, may also be added in amounts ranging from 0.2 to 2 or more parts per million. If the boiler feed waters are deficient in soluble silica compounds, soluble silicates may be added, in amounts such as 25 parts per million, to form with the heavy metal compounds, siliceous micelles having a silica-sesquioxide ratio of at least two to one.

Water soluble wetting agents may also be added to improve the heat transfer and boiling characteristics of the boiler water. The foam inhibiting compounds according to the present invention are potent enough to overcome the strong foaming tendency induced by these wetting agents.

When the saline concentration of boiler water has been built up to a certain degree, continued addition of foam inhibiting compounds may become unnecessary providing sufficient inorganic micelles are present, as the inorganic anions in conjunction with said inorganic micelles have a depressing effect which at high concentrations may suffice to inhibit adsorption of the potentially foam producing terminally polar organic substances. Boiler water having a high concentration of inorganic salts and inorganic micelles may be described as "self-conditioned" against foaming. It may be advisable, however, when adding feed water to such self-conditioning boiler water, also to add small amounts of foam inhibiting compounds, to prevent sudden foaming due to mutual adsorption of added organic matter and solid particles already present when the boiler water is diluted suddenly.

To boiler waters tending to foam periodically as the concentration of solids therein increases, foam inhibiting compounds may be added periodically as needed.

As pointed out hereinabove, various details may be varied through a wide range without departing from the principles of this invention and it is, therefore, not my purpose to limit the patent granted hereon otherwise than necessitated by the scope of the appended claims.

I claim as my invention:

1. The method of generating steam from a boiler water having a tendency to foam on boiling which comprises dispersing into said water a surface-active predominantly hydrophobic organic compound, each of the molecules of which includes interconnected hydrophilic radicals selected from the group consisting of ester and amide radicals, the hydrophilic radicals in said molecules each being spaced from one another by not more than five carbon atoms, each of said selected radicals having attached thereto an unsubstituted hydrocarbon chain containing at least twelve carbon atoms, and heating the resulting aqueous dispersion to the boiling point, said compound being dispersed into said water in an amount sufficient substantially to inhibit the tendency of said water to foam on boiling.

2. The method of generating steam from a boiler water having a tendency to foam on boiling, which comprises dispersing into said water a surface-active predominantly hydrophobic organic compound each of the molecules of which includes interconnected hydrophilic radicals selected from the group consisting of ester and amide radicals, the hydrophilic radicals in said molecules each being spaced from one another by not more than five carbon atoms, each of said selected radicals having attached thereto an unsubstituted hydrocarbon chain containing at least sixteen carbon atoms, and heating the resulting aqueous dispersion to the boiling point, said compound being dispersed into said water in an amount sufficient substantially to inhibit the tendency of said water to foam on boiling.

3. The method of generating steam from a boiler water having a tendency to foam on boiling, which comprises dispersing into said water a surface-active predominantly hydrophobic organic compound each of the molecules of which includes interconnected hydrophilic radicals selected from the group consisting of ester and amide radicals, the hydrophilic radicals in said molecules each being spaced from one another by not more than five carbon atoms, each of said selected radicals having attached thereto an unsubstituted hydrocarbon chain containing at least twelve carbon atoms, further incorporating a depressant with said water, and heating the resulting aqueous dispersion to the boiling point, said compound being dispersed into said water in an amount sufficient substantially to inhibit the tendency of said water to foam on boiling.

4. The method of generating steam from a boiler water having a tendency to foam on boiling, which comprises dispersing into said water a surface-active predominantly hydrophobic organic compound each of the molecules of which includes interconnected ester radicals each spaced from one another by not more than five carbon atoms, each of said ester radicals having attached thereto an unsubstituted hydrocarbon chain containing at least twelve carbon atoms, and heating the resulting aqueous dispersion to the boiling point, said compound being dispersed into said water in an amount sufficient substantially to inhibit the tendency of said water to foam on boiling.

5. The method of generating steam from a boiler water having a tendency to foam on boiling which comprises dispersing into said water a surface-active predominantly hydrophobic organic compound each of the molecules of which includes interconnected amide radicals, the amide radicals in said molecules each being spaced from one another by not more than five carbon atoms, each of said amide radicals having attached thereto a hydrocarbon chain containing at least twelve carbon atoms, and heating the resulting aqueous dispersion to the boiling point, said compound being dispersed into said water in an amount sufficient substantially to inhibit the tendency of said water to foam on boiling.

6. The method of generating steam from a boiler water having a tendency to foam on boiling which comprises dispersing into said water a surface-active predominantly hydrophobic aliphatic organic compound each of the molecules of which includes two interconnected amide radicals, the amide radicals in said molecules each being spaced from one another by not more than five carbon atoms, each of said two amide radicals being derived from a fatty acid containing at least sixteen carbon atoms, and heating the resulting aqueous dispersion to the boiling point, said compound being dispersed into said water in an amount sufficient substantially to inhibit the tendency of said water to foam on boiling.

7. The method of generating steam from a boiler water having a tendency to foam on boiling which comprises dispersing into said water a surface-active predominantly hydrophobic organic compound each of the molecules of which includes two interconnected amide radicals spaced from one another by an ethylene group, said two amide radicals each having attached thereto a hydrocarbon chain containing at least twelve carbon atoms, and heating the resulting aqueous dispersion to the boiling point, said compound being dispersed into said water in an amount sufficient substantially to inhibit the tendency of said water to foam on boiling.

8. The method of generating steam from a boiler water having a tendency to foam on boiling which comprises dispersing tricetyl citrate into said boiler water, and heating the resulting aqueous dispersion to the boiling point, said tricetyl citrate being dispersed into said water in an amount sufficient substantially to inhibit the tendency of said water to foam on boiling.

9. The method of generating steam from a boiler water having a tendency to foam on boiling which comprises dispersing the dipalmito amide of ethylene diamine into said water, and heating the resulting aqueous dispersion to the boiling point, said amide being dispersed into said water in an amount sufficient substantially to inhibit the tendency of said water to foam on boiling.

LEWIS O. GUNDERSON.

REFERENCES CITED

The following references are of record in the file of this patent:

UNITED STATES PATENTS

| Number | Name | Date |
|---|---|---|
| 1,892,857 | Spellmeyer | Jan. 3, 1933 |
| 2,028,091 | Jaeger | Jan. 14, 1936 |
| 2,122,716 | Graves | July 5, 1938 |
| 2,127,490 | Flaxman | Aug. 16, 1938 |
| 2,176,896 | Epstein et al. | Oct. 24, 1939 |
| 2,221,018 | Bachman et al. | Nov. 12, 1940 |
| 2,238,928 | Cahn et al. | Apr. 22, 1941 |
| 2,304,475 | Pool | Dec. 8, 1942 |
| 2,304,805 | Denman | Dec. 15, 1942 |
| 2,345,632 | Robinson et al. | Apr. 4, 1944 |

OTHER REFERENCES

Solvents, Booklet of Commercial Solvents Corporation, N. Y. (1936), page 32.